United States Patent
Wang et al.

(10) Patent No.: US 9,226,275 B2
(45) Date of Patent: *Dec. 29, 2015

(54) METHOD AND APPARATUS FOR ACKNOWLEDGEMENT SIGNALING

(71) Applicant: Nokia Technologies Oy, Espoo (FI)

(72) Inventors: Haiming Wang, Beijing (CN); Esa Malkamaki, Espoo (FI); Dajie Jiang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/449,909

(22) Filed: Aug. 1, 2014

(65) Prior Publication Data

US 2014/0341165 A1  Nov. 20, 2014

Related U.S. Application Data

(63) Continuation of application No. 12/028,558, filed on Feb. 8, 2008, now Pat. No. 8,830,914.

(60) Provisional application No. 60/889,148, filed on Feb. 9, 2007.

(51) Int. Cl.
```
H04W 72/04    (2009.01)
H04L 1/16     (2006.01)
H04L 1/18     (2006.01)
H04L 1/00     (2006.01)
H04L 1/12     (2006.01)
```

(52) U.S. Cl.
CPC ......... *H04W 72/0406* (2013.01); *H04L 1/0035* (2013.01); *H04L 1/1657* (2013.01); *H04L 1/1671* (2013.01); *H04L 1/188* (2013.01); *H04L 1/1854* (2013.01); *H04L 1/1887* (2013.01); *H04L 2001/125* (2013.01)

(58) Field of Classification Search
CPC ....... H04L 1/18; H04L 1/1812; H04L 1/1816; H04L 1/1829; H04L 1/1848; H04L 1/1854; H04L 1/1657; H04L 1/1671; H04L 1/188; H04W 28/04; H04W 72/042; H04W 72/0406
USPC ................... 370/329, 341, 431; 714/746–750
See application file for complete search history.

(56) References Cited

U.S. PATENT DOCUMENTS

| 5,555,266 A | 9/1996 | Buchholz et al. |
| 6,697,988 B2 | 2/2004 | Kim et al. |
| 7,145,889 B1 * | 12/2006 | Zhang et al. ................. 370/329 |
| 7,197,313 B1 | 3/2007 | Sohn |

(Continued)

FOREIGN PATENT DOCUMENTS

WO    2008/041824 A2    4/2008

OTHER PUBLICATIONS

Indian Office Action for related Indian Application No. 3228/CHENP/2009, dated Jun. 18, 2014, 2 pages.

(Continued)

*Primary Examiner* — Un C Cho
*Assistant Examiner* — Jeremy Costin
(74) *Attorney, Agent, or Firm* — Ditthavong & Steiner, P.C.

(57) ABSTRACT

An approach is provided for providing acknowledgement signaling. A transmission failure associated with data from a user equipment is determined. An allocation message is generated for signaling of the transmission failure to the user equipment. The allocation message provides allocation of resource for retransmission of the data.

20 Claims, 11 Drawing Sheets

(56) References Cited

U.S. PATENT DOCUMENTS

| | | | |
|---|---|---|---|
| 2003/0043764 | A1 | 3/2003 | Kim et al. |
| 2004/0109433 | A1 | 6/2004 | Khan |
| 2004/0258096 | A1 | 12/2004 | Yoon et al. |
| 2005/0105494 | A1 | 5/2005 | Kim et al. |
| 2008/0045255 | A1 | 2/2008 | Revel et al. |
| 2008/0101312 | A1 | 5/2008 | Suzuki et al. |
| 2008/0209297 | A1* | 8/2008 | Chandra et al. ............... 714/748 |
| 2008/0259862 | A1 | 10/2008 | Yeo et al. |
| 2008/0285491 | A1* | 11/2008 | Parkvall et al. ............... 370/310 |
| 2009/0022098 | A1 | 1/2009 | Novak et al. |
| 2009/0196239 | A1* | 8/2009 | Lee et al. ...................... 370/329 |
| 2009/0285163 | A1 | 11/2009 | Zhang et al. |
| 2010/0074211 | A1* | 3/2010 | Kim et al. ...................... 370/329 |
| 2012/0170525 | A1 | 7/2012 | Sorrentino |
| 2013/0156125 | A1 | 6/2013 | Ko et al. |

OTHER PUBLICATIONS

Chinese Office Action for related Chinese Patent Application No. 200880001468.5 dated Feb. 6, 2012, pp. 1-12.

International Search Report and Written Opinion, PCT/IB2008/000294, Jul. 24, 2008, pp. 1-16.

Xianchang, L,. Kai, L., Jun, Z.: An Improved Multiple Access Protocol for ATN. First International Conference on Communications and Networking in China 2006 (CHINACOM), Published Oct. 1, 2006, pp. 1-4.

European Office action for corresponding EP App. No. 08 709 790. 3-1237 dated Jun. 2, 2010, pp. 1-4.

European Office Action for related European Application No. 14179355.4-1851 dated Jan. 15, 2015, 9 pages.

Ericsson, "NDI-less HARQ Operation", 3GPP Draft; R2-070057, 3rd Generation Partnership Project (3GPP), Mobile Competence Centre, France, vol. RAN WG2, 2007, 6 Pages.

QUALCOMM, "TP on Scheduler Grants and Retransmissions", 3GPP Draft; R1-041107, 3rd Generation Partnership Project (3GPP), Mobile Competence Centre, France, vol. RAN WG1, 2004, 2 Pages.

Xianchang et al., "An Improved Multiple Access Protocol for ATN", First International Conference on Communications and Networking in China 2006 (CHINACOM), 2006, pp. 1-4.

* cited by examiner

METHOD AND APPARATUS FOR ACKNOWLEDGEMENT SIGNALING

RELATED APPLICATIONS

This application is a continuation of the U.S. application Ser. No. 12/028,558, filed Feb. 8, 2008, which claims the benefit of the earlier filing date under 35 U.S.C. §119(e) of U.S. Provisional Application Ser. No. 60/889,148 filed Feb. 9, 2007, entitled "Method and System For Acknowledgement Signaling," the entirety of which is incorporated by reference.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves developing error control schemes that efficiently utilize network resources (e.g., bandwidth, processing, etc.). Notably, the use of acknowledgement signaling can unnecessarily consume network resources.

SOME EXEMPLARY EMBODIMENTS

Therefore, there is a need for an approach for providing efficient acknowledgement signaling, which can co-exist with already developed standards and protocols.

These and other needs are addressed by various exemplary embodiments of the invention, in which an approach is presented for providing efficient acknowledgement signaling, whereby a negative acknowledgement is implicitly indicated in an allocation message.

According to one embodiment of the invention, a method comprises determining transmission failure associated with data from a user equipment. The method also comprises generating an allocation message for signaling the transmission failure to the user equipment. The allocation message provides allocation of resource for retransmission of the data.

According to another embodiment of the invention, an apparatus comprises a logic configured to determine transmission failure associated with data from a user equipment. The logic is further configured to generate an allocation message for signaling the transmission failure to the user equipment. The allocation message provides allocation of resource for retransmission of the data.

According to another embodiment of the invention, a method comprises transmitting data over a communication link of a network. The method also comprises receiving an allocation message from a network element for indicating transmission failure of the data. The allocation message provides allocation of resource for retransmission of the data. The method further comprises retransmitting the data in response to the received allocation message.

According to yet an exemplary embodiment, an apparatus comprises a transceiver configured to transmit data over a communication link of a network, and to receive an allocation message from a network element for indicating transmission failure of the data. The allocation message provides allocation of resource for retransmission of the data. The apparatus also comprises a processor coupled to the transceiver and configured to initiate retransmission of the data in response to the received allocation message.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The invention is illustrated by way of example, and not by way of limitation, in the figures of the accompanying drawings in which like reference numerals refer to similar elements and in which.

DESCRIPTION OF PREFERRED EMBODIMENT

An apparatus, method, and software for providing an efficient error control scheme in a communication network are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with the Third Generation Partnership Project (3GPP) Long Term Evolution (LTE) architecture with respect to the Hybrid Automatic Repeat Request (HARQ) scheme, it is recognized by one of ordinary skill in the art that the embodiments of the inventions have applicability to any type of radio communication system and equivalent error control schemes.

Figure 1:
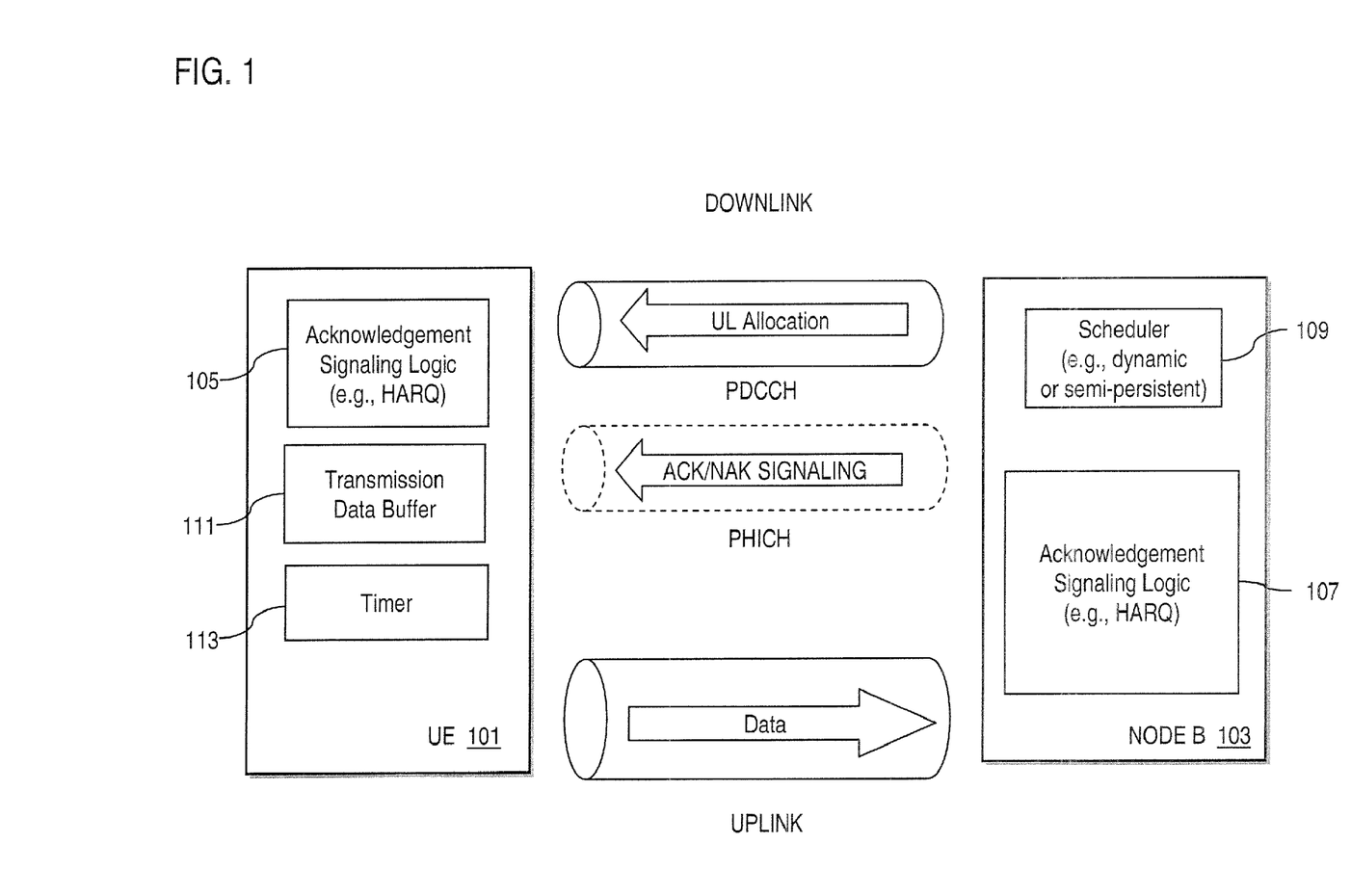
FIG. 1 is a diagram of a communication system capable of providing acknowledgement signaling, in accordance with various embodiments of the invention.

FIG. 1 is a diagram of a communication system capable of providing acknowledgement signaling, in accordance with various embodiments of the invention. A communication system 100 includes one or more user equipment (UEs) 101 that communicate with a network equipment (or network element), such as a base station 103, which is part of an access network (e.g., WiMAX (Worldwide Interoperability for Microwave Access), 3GPP LTE (or E-UTRAN or 3.9G), etc.). Under the 3GPP LTE architecture (as shown in FIGS. 5A-5D), base station 103 is denoted as an enhanced Node B (eNB). The UE 101 can be any type of mobile stations, such as handsets, terminals, stations, units, devices, or any type of interface to the user (such as "wearable" circuitry, etc.).

The base station 103, in an exemplary embodiment, uses OFDM (Orthogonal Frequency Divisional Multiplexing) as a downlink (DL) transmission scheme and a single-carrier transmission (e.g., SC-FDMA (Single Carrier-Frequency Division Multiple Access) with cyclic prefix for the uplink (UL) transmission scheme. SC-FDMA can also be realized using a DFT-S-OFDM principle, which is detailed in 3GGP TR 25.814, entitled "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

One aspect of the 3GPP LTE system 100 is that an error control scheme referred to as Hybrid Automatic Repeat Request (HARQ) is utilized. The HARQ scheme basically combines ARQ protocols with forward-error-correction (FEC) schemes, to provide an error-control technique for wireless links. It is noted that different wireless technologies may utilize different HARQ schemes. HARQ can be used to increase the link and spectral efficiency of LTE, as HARQ allows the system to operate at a relative high block error rate of the first transmissions. The HARQ scheme can be made part of the medium access control (MAC) layer and be enabled on a terminal by terminal basis.

As such, acknowledgement signaling logic (or error control logic) 105, 107 are configured to support this HARQ mechanism, according to one embodiment. With the HARQ scheme, the transmitting node essentially encodes the data to be transmitted on, for example, an uplink with an appropriate error control code. If no errors are detected at the receiver, the receiving node sends a control signal commonly referred to as an acknowledgement (ACK) signal to the transmitting node, indicating the correct or proper reception of data. If, on the other hand, one or more errors are detected at the receiving node and furthermore cannot all be corrected, the receiving node sends another type of control signal referred to as a negative acknowledgement (NAK) to the transmitter requesting retransmission of the data. This process continues until the data is correctly received at the receiving node. This scheme, unfortunately, results in the utilization of valuable bandwidth due to the need to send ACK and NAK signals. That is, each time that ACK/NAK control signals are sent between the nodes, their transmissions occupy the precious bandwidth of the wireless network because traditional systems need to maintain the single-carrier properties for the transmission.

Therefore, HARQ, as one of link adaptation scheme plays an important role in the improved system performance by retransmitting the incorrectly received packet. As mentioned, generally ACK/NAK (acknowledgement/negative acknowledgement) signaling in the HARQ scheme always follows with each transmitted packet by using the explicit signaling. Specifically, ACK is used to indicate the correctly received packet. However, a NAK indicates that the packet is not received correctly. It is recognized that if the explicit ACK/NAK is sent in, for example, a downlink (DL) for every UL transmission, the amount of DL physical resource that is actually consumed is a non-negligible amount. Furthermore, the explicit ACK/NAK signaling, conventionally, is vulnerable to errors due to the loss of Cyclic Redundancy Check (CRC) protection.

In this example, on the downlink (i.e., traffic from the base station 103 to the UE 101), two channels are deployed: Physical Downlink Control Channel (PDCCH) and a separate Physical H-ARQ indication channel (PHICH). The PDCCH is used to convey scheduling decisions to the UE 101. Under the LTE architecture, H-ARQ operation for dynamic scheduled uplink data provides that for each uplink resource grant (signaled on a downlink control channel (e.g., PDCCH)), there is an associated H-ARQ feedback channel for positive and negative acknowledgements (ACK/NACK)—i.e., PHICH. According to various embodiments, this PHICH is overridden by the PDCCH, as implicit acknowledgement signaling is utilized. It is contemplated that the system 100 can operate without the use of the PHICH channel, according to one embodiment.

The system 100, according to certain embodiments, effectively provides acknowledgement signaling, e.g., Hybrid Automatic Repeat Request, without the need for use of acknowledgement messages (ACK) and negative acknowledgement messages (NAK or NACK). This ACK/NAK scheme can reduce the downlink (DL) signaling and improve system performance.

In an exemplary embodiment, it is further recognized that the HARQ scheme, which combines ARQ protocols with forward-error-correction (FEC) schemes, provides a sound error-control technique for wireless links. It is noted that different wireless technologies may utilize different HARQ schemes. HARQ can be used to increase the link and spectral efficiency of LTE, as HARQ allows the system to operate at a relative high block error rate of the first transmissions. In exemplary embodiment, the HARQ scheme can be made part of the medium access control (MAC) layer and be enabled on the terminal 101 and the Node B 103.

When HARQ is operating in one link direction (e.g., Uplink (UL) or Downlink (DL)), a control channel is needed in the other link direction to determine whether data packets were received and/or successfully decoded by the other end. This control channel typically carries ACK or NAK messages.

It is noted that the signaling of control information (e.g., HARQ information) is used in support of the uplink HARQ functionality. ACK/NAK information is transmitted on DL for each transmission and the ACK/NAK information indicates whether the successful or unsuccessful decoding of the corresponding uplink transmission. This information allows the UE 101 to know whether to make another transmission for the same transmission that was sent before or the transmission of a new one which is explained for High Speed Downlink Packet Access (HSDPA)/High Speed Uplink Packet Access (HSUPA) in detail in the 3GPP TS 25.321 v.7.2.0 which is incorporated herein by reference in its entirety.

The HARQ protocol, which is explained in detail for HSDPA/HSUPA in the 3GPP TS 25.308 which is incorporated herein by reference in its entirety, is based on an asynchronous downlink and synchronous uplink scheme. The ARQ combining scheme is based on incremental redundancy. Chase combining is a particular case of incremental redundancy. The UE soft memory capability can be defined according to the needs for chase combining. The soft memory (not shown) is partitioned across the HARQ processes in a semistatic fashion through upper layer signaling. The system 100 takes into account the UE soft memory capability when configuring the different transport formats (including possibly multiple redundancy versions for the same effective code rate) and when selecting transport for transmission and retransmission, according to one embodiment.

For the LTE system 100 (in one embodiment), DL HARQ can be asynchronous adaptive, while the UL is synchronous non-adaptive. The UL HARQ adaptive scheme provides several advantages since then the retransmission can be allocated on any free resource (non-adaptive requires that the same allocation is used for the first and retransmissions). Similar to HSDPA/HSUPA, incremental redundancy and chase combining are also considered for LTE.

As shown, a scheduler 109, within the Node B 103, supports dynamic or semi-persistent scheduling, according to certain embodiments. For dynamic scheduling, resources are dynamically allocated for both initial transmissions and retransmissions. As for semi-persistent scheduling, persistent scheduling is performed for initial transmissions, while dynamic scheduling is utilized for retransmissions.

Figure 4A:
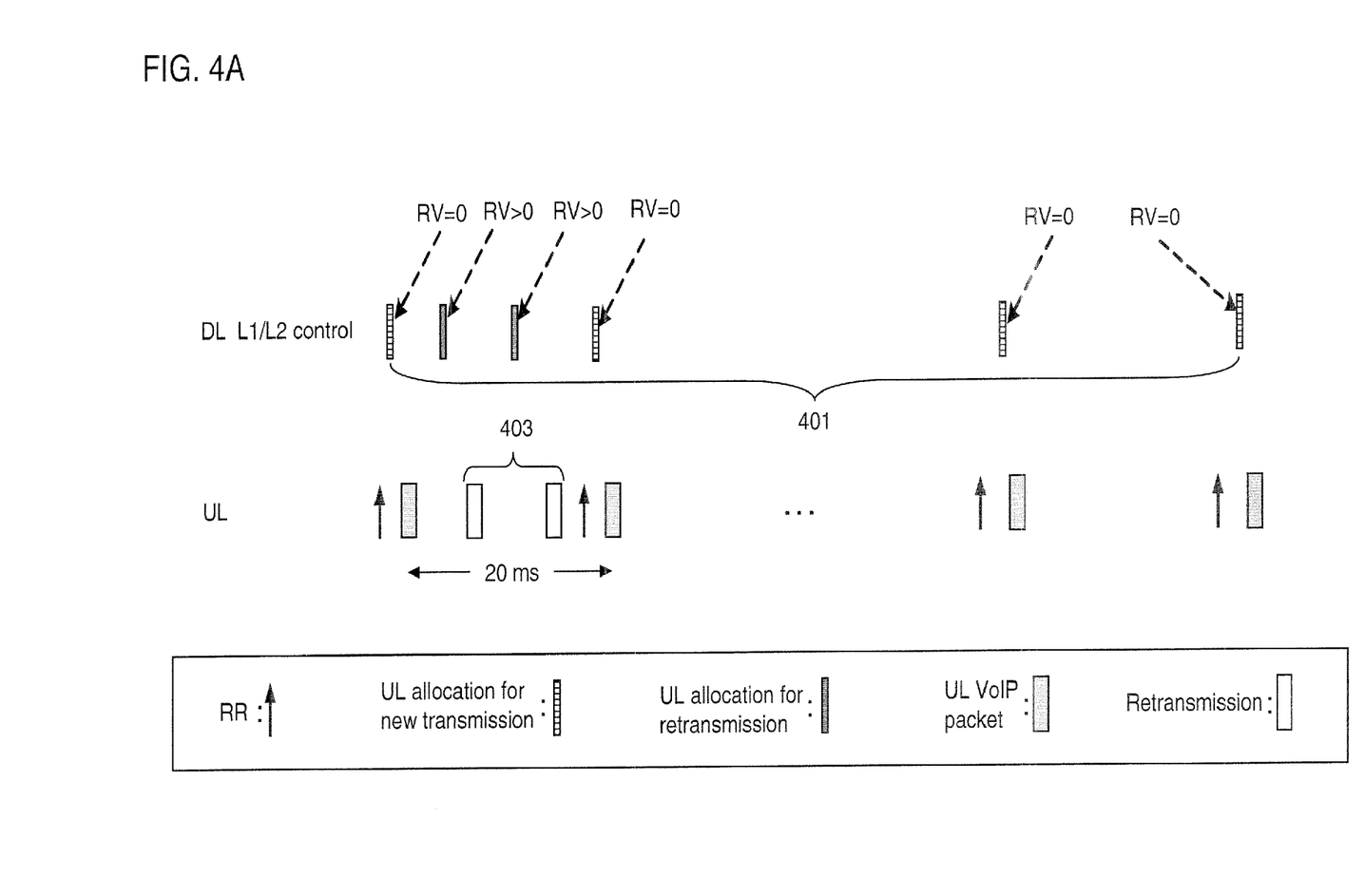
FIGS. 4A and 4B are diagrams illustrating a dynamic scheduling scheme, and a semi-persistent scheduling scheme, respectively, in accordance with an embodiment of the invention.
Figure 4B:
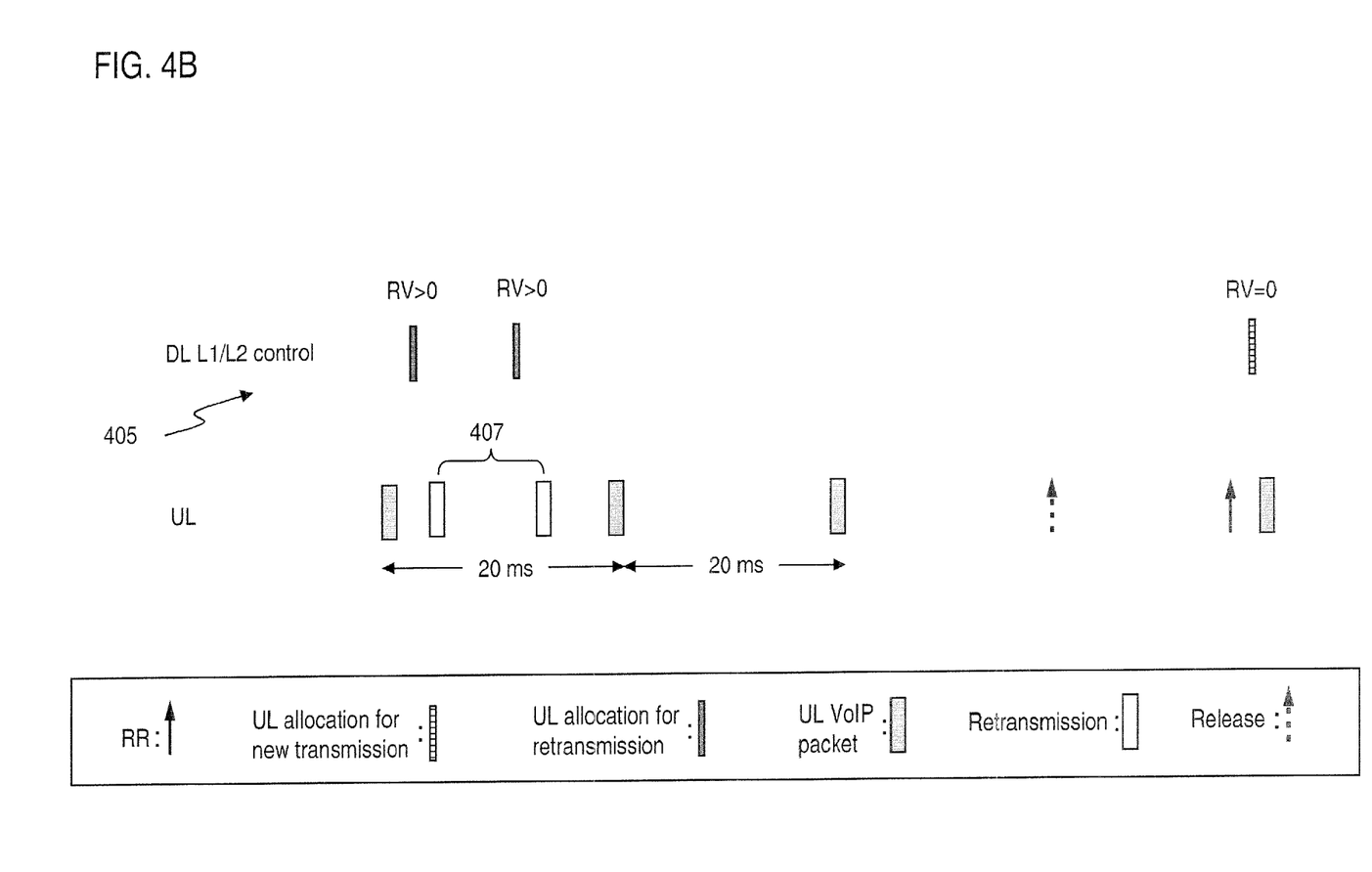
Figure 5A:
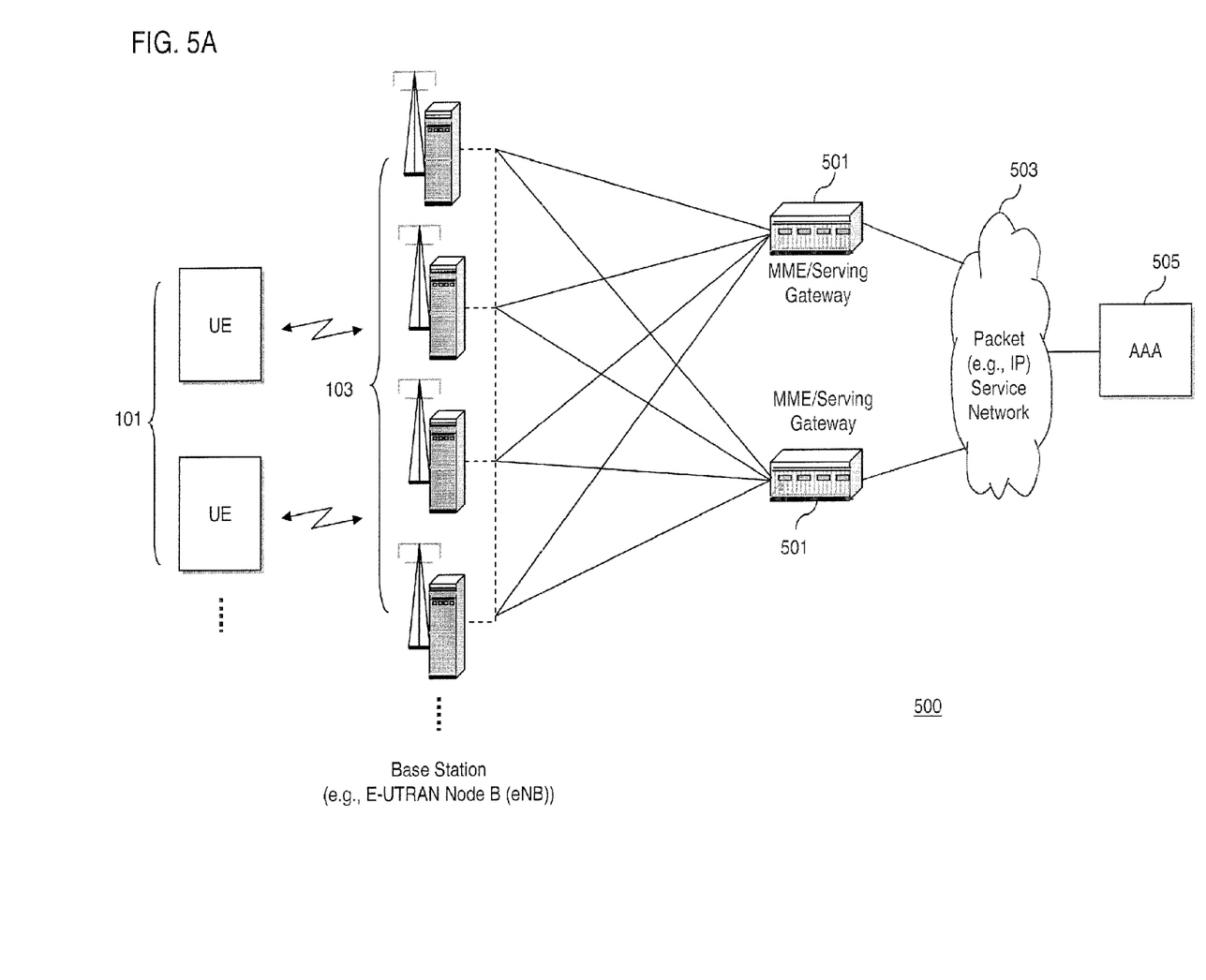
FIGS. 5A-5D are diagrams of communication systems having exemplary long-term evolution (LTE) architectures, in which the system of FIG. 1 can operate, according to various exemplary embodiments of the invention.

In certain embodiments, both schemes employ allocation signaling, such as uplink (UL) allocation (using L1/L2 control signaling on Physical Downlink Control Channel (PDCCH) for example) in the downlink (DL) to provide resource allocation for UL traffic. This "UL Allocation" signaling can indicate the used resources for both new packet and retransmission packet. The operation of the scheduler 109 is further explained in FIGS. 4 and 5 in the context of such real-time applications as Voice over IP (VoIP).

With respect to the UE 101, a transmission data buffer 111 is utilized to store data that is to be transmitted over the uplink. Once the data is successfully transmitted, the data can be deleted or purged/flushed from the buffer 111. This deletion process, in an exemplary embodiment, involves use of a timer 113 for determining when the buffer 111 can be cleared, as explained below.

Figure 2:
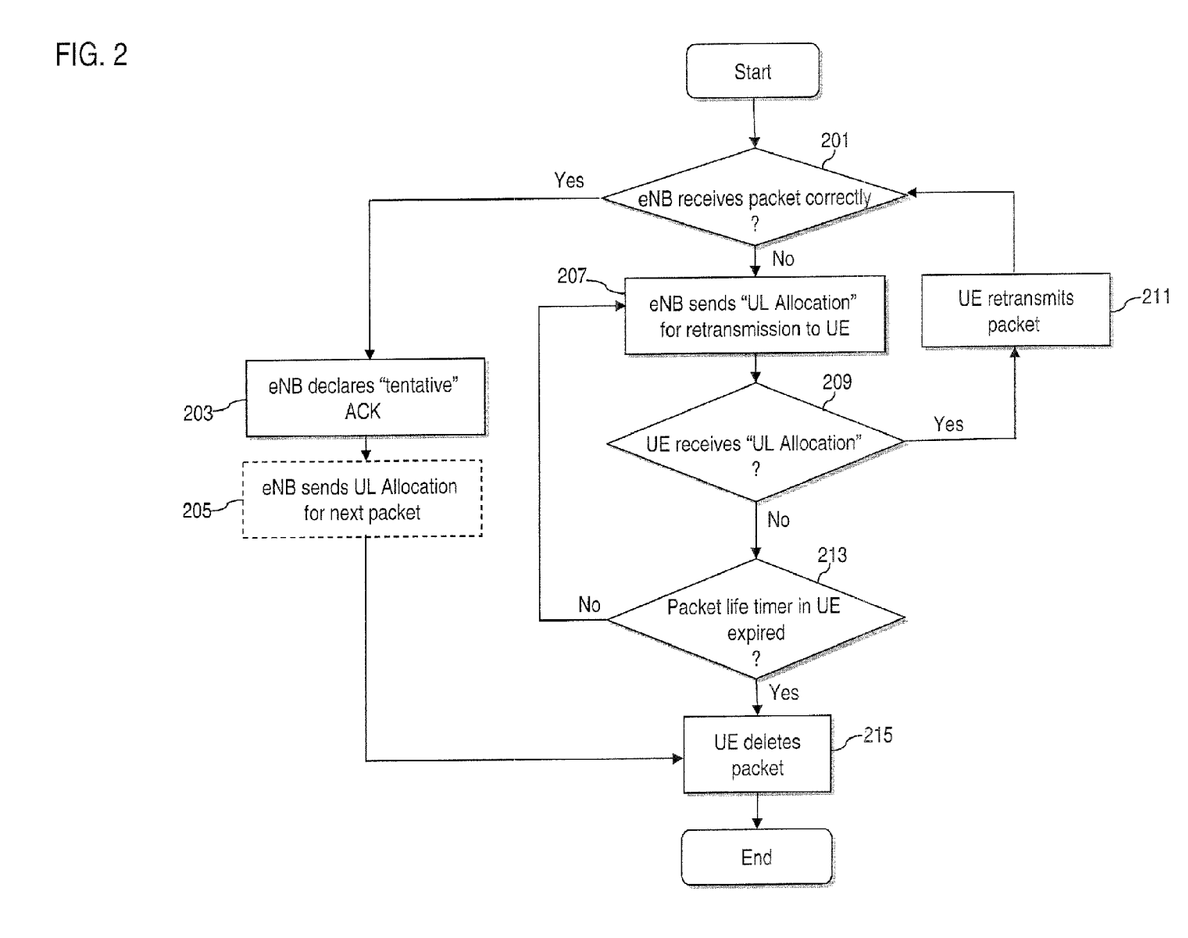
FIG. 2 is a flowchart of a process for acknowledgement signaling, in accordance with an embodiment of the invention.

FIG. 2 is a flowchart of a process for acknowledgement signaling, in accordance with an embodiment of the invention. For the purposes of illustration, the ACK/NAK mechanism is described for both dynamic scheduling and semi-persistent scheduling in the LTE system 100 of FIG. 1. Under this scenario, the UE 101 has data to transmit over the network 100, and thus, sends the data to the base station 103 via an uplink (UL). In an exemplary embodiment, neither ACK nor NAK is sent in the downlink (DL) for UL traffic. As seen in FIG. 2A, in step 201, when the e-Node-B 103 correctly receives the UE's packet, the e-Node-B 103 need not provide any signaling to the UE 101 about the transmission. In one embodiment, the e-Node-B 103 declares a 'tentative' ACK (step 203); alternatively, the e-Node-B 103 sends an UL allocation for the next packet, per step 205.

However, if the data transmission is unsuccessful, the eNB 103 may not provide any explicit signaling for the negative acknowledgement (NAK). Instead, the eNB 103 may generate an allocation for the retransmission of the data, as in step 207. That is, when the e-Node-B 103 does not receive the packet (transmission fails), the e-Node-B 103 sends "UL Allocation" signaling for retransmission to the UE 101 (e.g., adaptive HARQ can be utilized). If the UE 101 receives (per step 209) "UL Allocation," the UE 101 retransmits the packet, per step 211. Consequently, a NAK is implicitly conveyed through the sending of an UL Allocation message for the retransmission (for adaptive HARQ) over, e.g., a Physical Downlink Control Channel (PDCCH). In one embodiment, in which a separate channel, PHICH (Physical H-ARQ indication channel can exist, ACK/NAK signaling over this channel can simply be ignored. That is, the uplink grant received on the PDCCH overrides the explicit ACK/NAK sent on the PHICH.

According to one embodiment, if the UE 101 does not receive the UL allocation within a defined, configurable time set by the timer 113 (as determined in step 213), the UE 101 deletes the packet from the buffer 111 upon expiry of the timer 113 (step 215). In one embodiment, the UE 101 counts the number of retransmissions and when a maximum value (or threshold value) is reached, the UE 101 flushes the buffer 111; however, due to synchronous HARQ (i.e., fixed time between transmissions), this is equivalent to a timer.

Alternatively, the UE 101 can flush the buffer 111 when upon receiving a grant over the PDCCH indicating a new transmission.

In the case of no "UL Allocation" being received, this is first interpreted by the UE 101 as a "tentative" ACK. If the "UL Allocation" for retransmission is missed (a kind of "NAK→ACK" error), then the packet to be retransmitted in the UL cannot be sent. The e-Node-B 103 is configured to recognize this (i.e., eNB 103 can notice there is no retransmission) and to perform a new allocation for the retransmission (after HARQ RTT (Round Trip Time) for synchronous HARQ). This may take place several times until the retransmission succeeds. As explained, the timer 113 can be defined for packet life in UE buffer 111. Accordingly, only after the defined timer 113 (and if UE 101 does not receive "UL Allocation" for retransmission) expires, the packet will be deleted from the UE buffer 111.

By contrast to traditional systems, which require reservation of inband resources for ACK/NAK signaling, the above process does not need such reservation.

Figure 3:
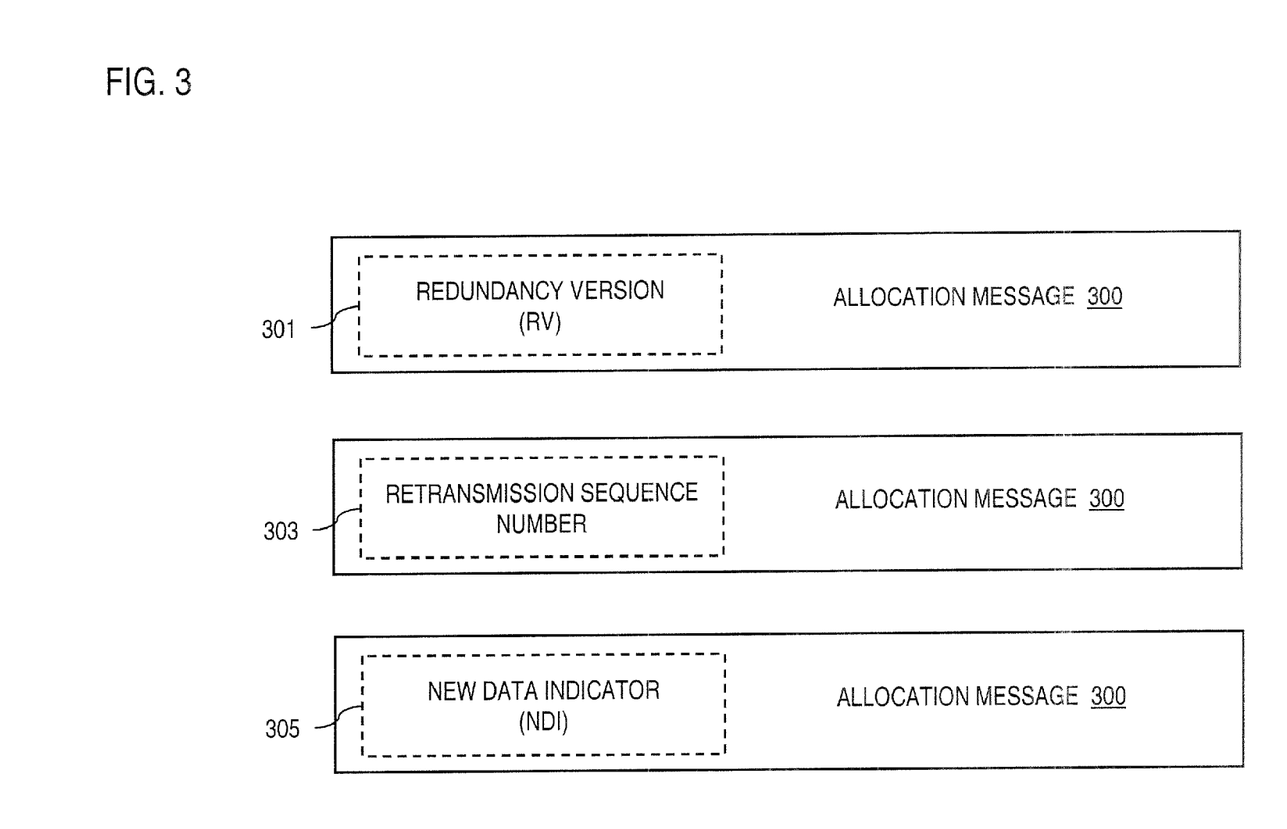
FIG. 3 is a diagram of allocation messages with different fields for requesting retransmission, in accordance with various embodiments of the invention.

FIG. 3 is a diagram of allocation messages with examples of different fields for requesting retransmission, in accordance with various embodiments of the invention. In the signaling process of FIG. 2, the UE 101 needs to determine whether the allocation relates to the first (or original) transmission, or a retransmission. The allocation message 300 can define a field to specify this information. In one embodiment, a Redundancy Version (RV) field 301 is defined; for example, RV=0 for first transmission and others for retransmissions. In this manner, "UL Allocation" with "RV=0" (new transmission requested) can be interpreted as an "ACK". Conversely, "UL Allocation" with RV other than 0 is interpreted as a "NAK."

In another embodiment, a Retransmission Sequence Number (RSN) 303 can be defined, whereby RSN with a value of "0" can denote a first transmission, and non-zero values (e.g., RSN=1, 2, 3 . . . ) can signify a retransmission. Therefore, a UL allocation message with "RSN=0" can be interpreted as the so-called "ACK" (i.e., new transmission requested). "UL Allocation" with RSN not equal to 0 is interpreted as a NAK. RSN can indicate the RV as well.

Further, the allocation message 300 can utilize a New Data Indicator (NDI) field 305 such that if the NDI 305 has the same value as in the previous transmission for a given HARQ process, the UE 101 knows that the received "UL Allocation" is for retransmission. Otherwise, the UE 101 declares that the received "UL Allocation" is for a new transmission. It is contemplated that other ways of indicating the first and retransmissions can be provided. The signaling need simply notify the UE 101 about whether an UL allocation is for a first transmission or for a retransmission.

It is noted that with semi-persistent scheduling, the "UL Allocation" for initial transmission is (typically) not sent via L1/L2 control signaling. Instead the allocation for the initial transmissions can be sent via Radio Resource Control (RRC)

signaling or via MAC (Medium Access Control) signaling (MAC control PDU (packet data unit)) or via L1/L2 control signaling at the beginning of the talk spurt (the L1/L2 signaling should somehow indicate that the allocation is persistent—i.e., to be used for a longer time). The "UL Allocation" for retransmission can be sent via L1/L2 signaling. Thus, in this case there is no need to distinguish new transmission or retransmission for semi-persistent scheduling because they are (typically) sent via different signaling. Initial transmission using persistent allocation is not "allocated" using the L1/L2 signaling whereas retransmissions are explicitly allocated with L1/L2 signaling. If the "UL Allocation" for initial transmission is also sent via L1/L2 signaling, then e.g., RV/RSN/NDI must be used to indicate new/retransmission.

In one embodiment, the NAK is implicit in the "UL Allocation" signaling for a retransmission (e.g., RSN/RV=1, 2, 3 . . . ). An explicit ACK is no longer needed: if packet is received correctly by e-Node-B 103, nothing is sent to UE 101, the received packet will be deleted after the defined timer or when the next new transmission in the same HARQ process is transmitted. The defined timer can be equal to the traffic delay budget (DB), for example.

FIGS. 4A and 4B are diagrams illustrating a dynamic scheduling scheme, and a semi-persistent scheduling scheme, respectively, in accordance with an embodiment of the invention. In the example of FIG. 4A, UL allocation 401 is sent for all transmissions: new transmissions and retransmissions. RV is used to explicitly specify Redundancy Version, and implicitly indicate ACK/NAK: RV=0 is for the initial transmissions and an ACK is inferred, RV>0 is for retransmissions 403 and NAK is inferred. As described previously, for instance, RSN and NDI fields can also be used to provide implicit indication of NAKs.

In FIG. 4B, a semi-persistent scheduling scenario is shown. Typically, UL allocation 401 is sent only for the retransmissions (RV or RSN>0). At the beginning of a talk spurt (after a silent period), UL allocation 405 is sent for the talk spurt and indicated, e.g., with RV=0 (or RSN=0) (this is shown for the last packet in FIG. 4A). Also, the SID (silence descriptor) frames could be scheduled dynamically and would require the UL allocation of the first transmission (RV or RSN=0) or semi-persistently. It is assumed that UL allocations for new transmissions (persistent) and retransmissions 407 (one-time or persistent) are both sent via L1/L2 signaling. In contrast to dynamic scheduling, the only difference is that UL allocation for initial transmission is sent "persistently".

According to the examples of FIGS. 4A and 4B, "UL Allocation" can perform the NAK and ACK function. By using such scheme, signaling overhead from acknowledgement signaling is reduced, the reliability of "ACK/NAK" is improved (due to CRC protection on PDCCH) and, furthermore, in an exemplary embodiment, adaptive HARQ can be used for UL.

The reliability of ACK and NAK is increased as it is sent implicitly inside the UL allocation message, which should be cyclic redundancy check (CRC) protected. Therefore, whenever the UL allocation is received correctly (CRC matches), the implicit ACK or NAK is received correctly.

By way of example, the communication system of FIG. 1 utilizes an architecture compliant with the UMTS terrestrial radio access network (UTRAN) or Evolved UTRAN (E-UTRAN) in 3GPP, as next described.

FIGS. 5A-5D are diagrams of communication systems having exemplary LTE architectures, in which the system of FIG. 1 can operate, according to various exemplary embodiments of the invention. By way of example (shown in FIG. 1), the base station and the UE can communicate in system 500 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (SC-FDMA) or a combination thereof. In an exemplary embodiment, both uplink and downlink can utilize WCDMA. In another exemplary embodiment, uplink utilizes SC-FDMA, while downlink utilizes OFDMA.

The MME (Mobile Management Entity)/Serving Gateways 501 are connected to the eNBs in a full or partial mesh configuration using tunneling over a packet transport network (e.g., Internet Protocol (IP) network) 503. Exemplary functions of the MME/Serving GW 501 include distribution of paging messages to the eNBs, IP header compression, termination of U-plane packets for paging reasons, and switching of U-plane for support of UE mobility. Since the GWs 501 serve as a gateway to external networks, e.g., the Internet or private networks 503, the GWs 501 include an Access, Authorization and Accounting system (AAA) 505 to securely determine the identity and privileges of a user and to track each user's activities. Namely, the MME Serving Gateway 501 is the key control-node for the LTE access-network and is responsible for idle mode UE tracking and paging procedure including retransmissions. Also, the MME 501 is involved in the bearer activation/deactivation process and is responsible for selecting the SGW (Serving Gateway) for a UE 101 at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 5B:
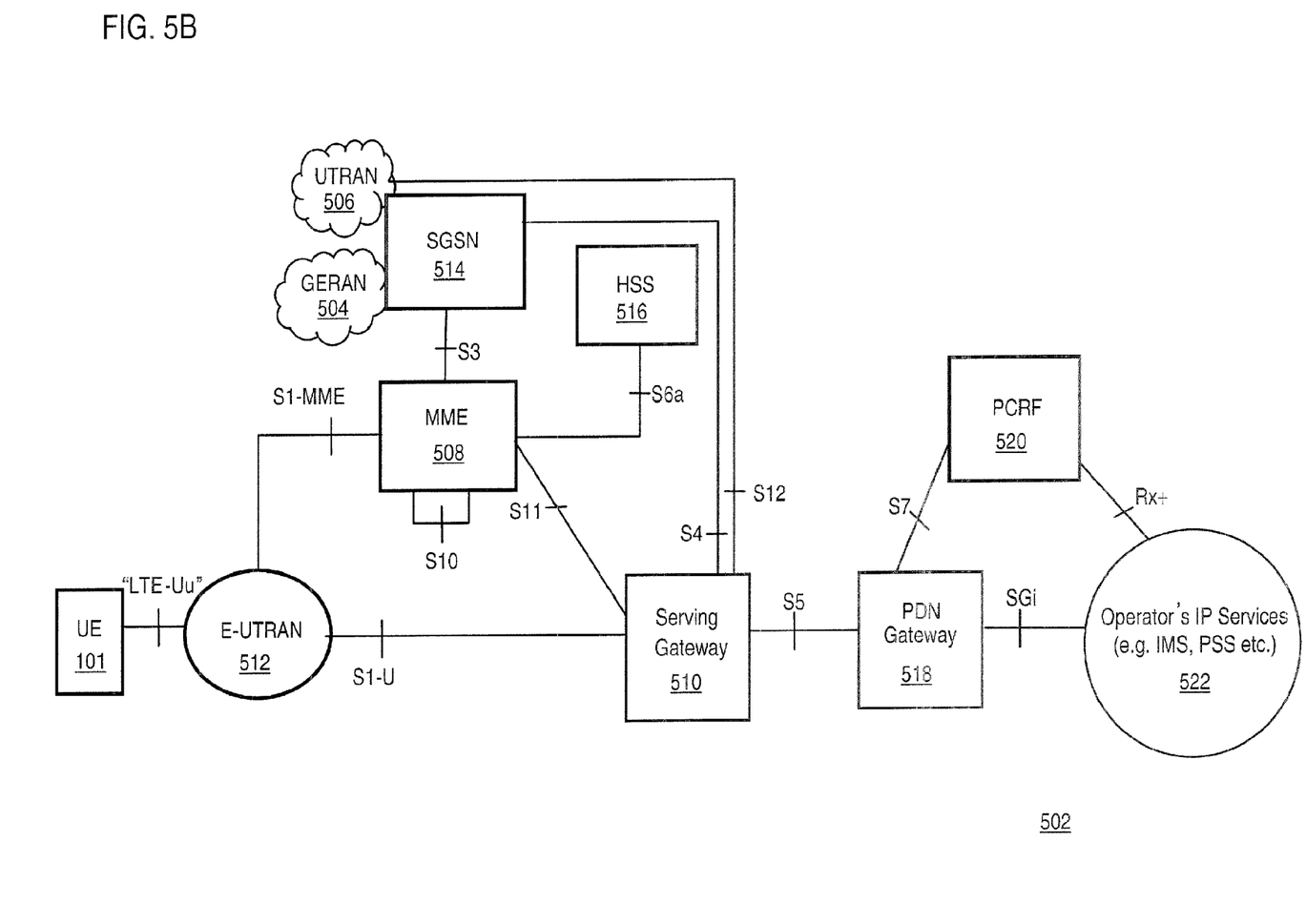

In FIG. 5B, a communication system 502 supports GERAN (GSM/EDGE radio access) 504, and UTRAN 506 based access networks, E-UTRAN 512 and non-3GPP (not shown) based access networks, and is more fully described in TR 23.882, which is incorporated herein by reference in its entirety. A key feature of this system is the separation of the network entity that performs control-plane functionality (MME 508) from the network entity that performs bearer-plane functionality (Serving Gateway 510) with a well defined open interface between them S11. Since E-UTRAN 512 provides higher bandwidths to enable new services as well as to improve existing ones, separation of MME 508 from Serving Gateway 510 implies that Serving Gateway 510 can be based on a platform optimized for signaling transactions. This scheme enables selection of more cost-effective platforms for, as well as independent scaling of, each of these two elements. Service providers can also select optimized topological locations of Serving Gateways 510 within the network independent of the locations of MMEs 508 in order to reduce optimized bandwidth latencies and avoid concentrated points of failure.

The basic architecture of the system 502 contains following network elements. As seen in FIG. 5B, the E-UTRAN (e.g., eNB) 512 interfaces with UE via LTE-Uu. The E-UTRAN 512 supports LTE air interface and includes functions for radio resource control (RRC) functionality corresponding to the control plane MME 508. The E-UTRAN 512 also performs a variety of functions including radio resource management, admission control, scheduling, enforcement of negotiated uplink (UL) QoS (Quality of Service), cell information broadcast, ciphering/deciphering of user, compression/decompression of downlink and uplink user plane packet headers and Packet Data Convergence Protocol (PDCP).

The MME 508, as a key control node, is responsible for managing mobility UE 101 identifies and security parameters and paging procedure including retransmissions. The MME 508 is involved in the bearer activation/deactivation process and is also responsible for choosing Serving Gateway 510 for the UE 101. MME 508 functions include Non Access Stratum (NAS) signaling and related security. MME 508 checks the authorization of the UE 101 to camp on the service provider's Public Land Mobile Network (PLMN) and enforces UE 101 roaming restrictions. The MME 508 also provides the control plane function for mobility between LTE and 2G/3G access networks with the S3 interface terminating at the MME 508 from the SGSN (Serving GPRS Support Node) 514. The principles of PLMN selection in E-UTRA are based on the 3GPP PLMN selection principles. Cell selection can be required on transition from MME_DETACHED to EMM-IDLE or EMM-CONNECTED. The cell selection can be achieved when the UE NAS identifies a selected PLMN and equivalent PLMNs. The UE 101 searches the E-UTRA frequency bands and for each carrier frequency identifies the strongest cell. The UE 101 also reads cell system information broadcast to identify its PLMNs. Further, the UE 101 seeks to identify a suitable cell; if it is not able to identify a suitable cell, it seeks to identify an acceptable cell. When a suitable cell is found or if only an acceptable cell is found, the UE 101 camps on that cell and commences the cell reselection procedure. Cell selection identifies the cell that the UE 101 should camp on.

The SGSN 514 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 508 and HSS (Home Subscriber Server) 516. The S10 interface between MMEs 508 provides MME relocation and MME 508 to MME 508 information transfer. The Serving Gateway 510 is the node that terminates the interface towards the E-UTRAN 512 via S1-U.

The S1-U interface provides a per bearer user plane tunneling between the E-UTRAN 512 and Serving Gateway 510. It contains support for path switching during handover between eNBs 512. The S4 interface provides the user plane with related control and mobility support between SGSN 514 and the 3GPP Anchor function of Serving Gateway 510.

The S12 is an interface between UTRAN 506 and Serving Gateway 510. Packet Data Network (PDN) Gateway 518 provides connectivity to the UE 101 to external packet data networks by being the point of exit and entry of traffic for the UE 101. The PDN Gateway 518 performs policy enforcement, packet filtering for each user, charging support, lawful interception and packet screening. Another role of the PDN Gateway 518 is to act as the anchor for mobility between 3GPP and non-3GPP technologies such as WiMax and 3GPP2 (CDMA 1X and EvDO (Evolution Data Only)).

The S7 interface provides transfer of QoS policy and charging rules from PCRF (Policy and Charging Role Function) 520 to Policy and Charging Enforcement Function (PCEF) in the PDN Gateway 518. The SGi interface is the interface between the PDN Gateway and the operator's IP services including packet data network 522. Packet data network 522 may be an operator external public or private packet data network or an intra operator packet data network, e.g., for provision of IMS (IP Multimedia Subsystem) services. Rx+ is the interface between the PCRF and the packet data network 522.

Figure 5C:
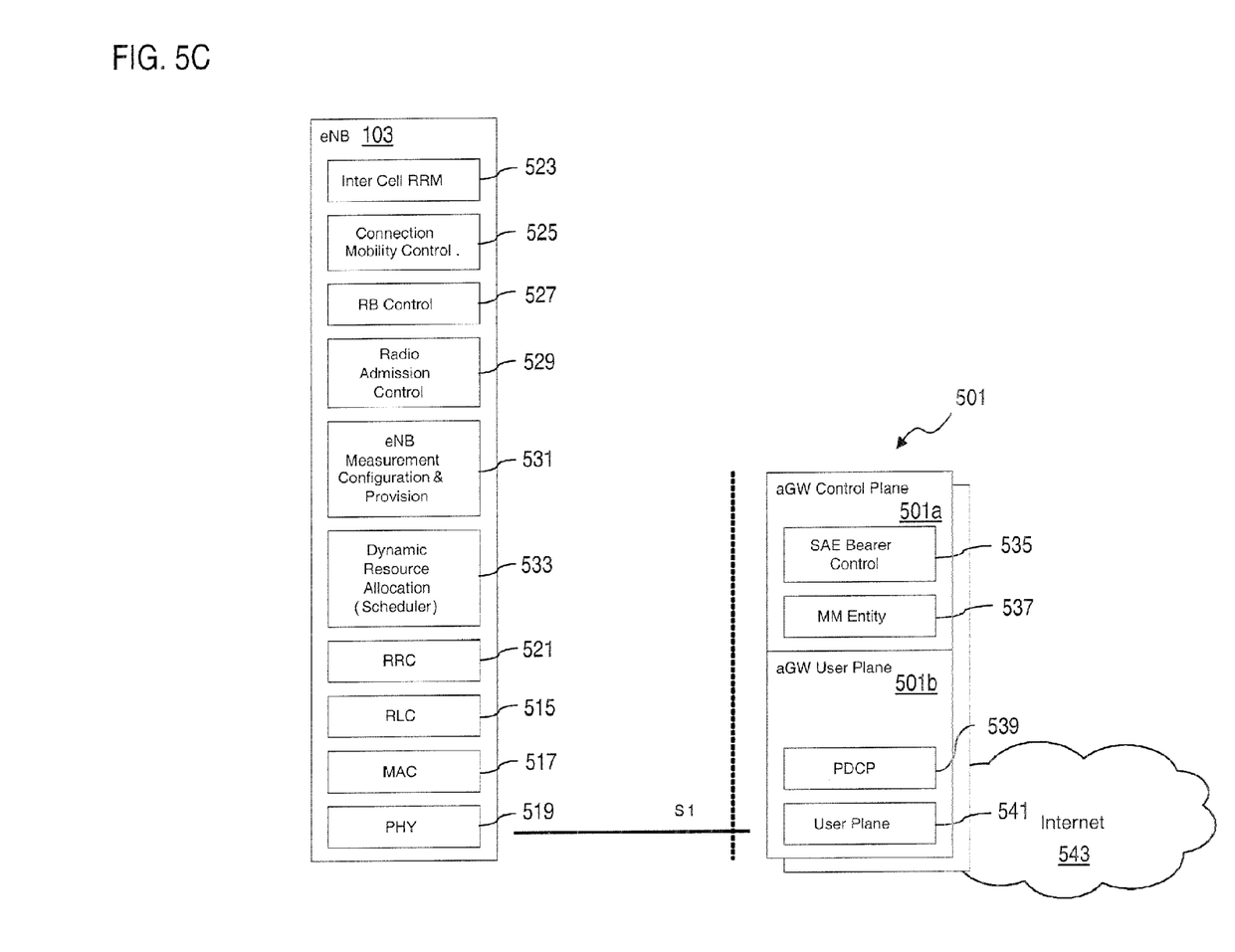

As seen in FIG. 5C, the eNB utilizes an E-UTRA (Evolved Universal Terrestrial Radio Access) (user plane, e.g., RLC (Radio Link Control) 515, MAC (Media Access Control) 517, and PHY (Physical) 519, as well as a control plane (e.g., RRC 521)). The eNB also includes the following functions: Inter Cell RRM (Radio Resource Management) 523, Connection Mobility Control 525, RB (Radio Bearer) Control 527, Radio Admission Control 529, eNB Measurement Configuration and Provision 531, and Dynamic Resource Allocation (Scheduler) 533.

The eNB communicates with the aGW 501 (Access Gateway) via an S1 interface. The aGW 501 includes a User Plane 501*a* and a Control plane 501*b*. The control plane 501*b* provides the following components: SAE (System Architecture Evolution) Bearer Control 535 and MM (Mobile Management) Entity 537. The user plane 501*b* includes a PDCP (Packet Data Convergence Protocol) 539 and a user plane functions 541. It is noted that the functionality of the aGW 501 can also be provided by a combination of a serving gateway (SGW) and a packet data network (PDN) GW. The aGW 501 can also interface with a packet network, such as the Internet 543.

Figure 5D:
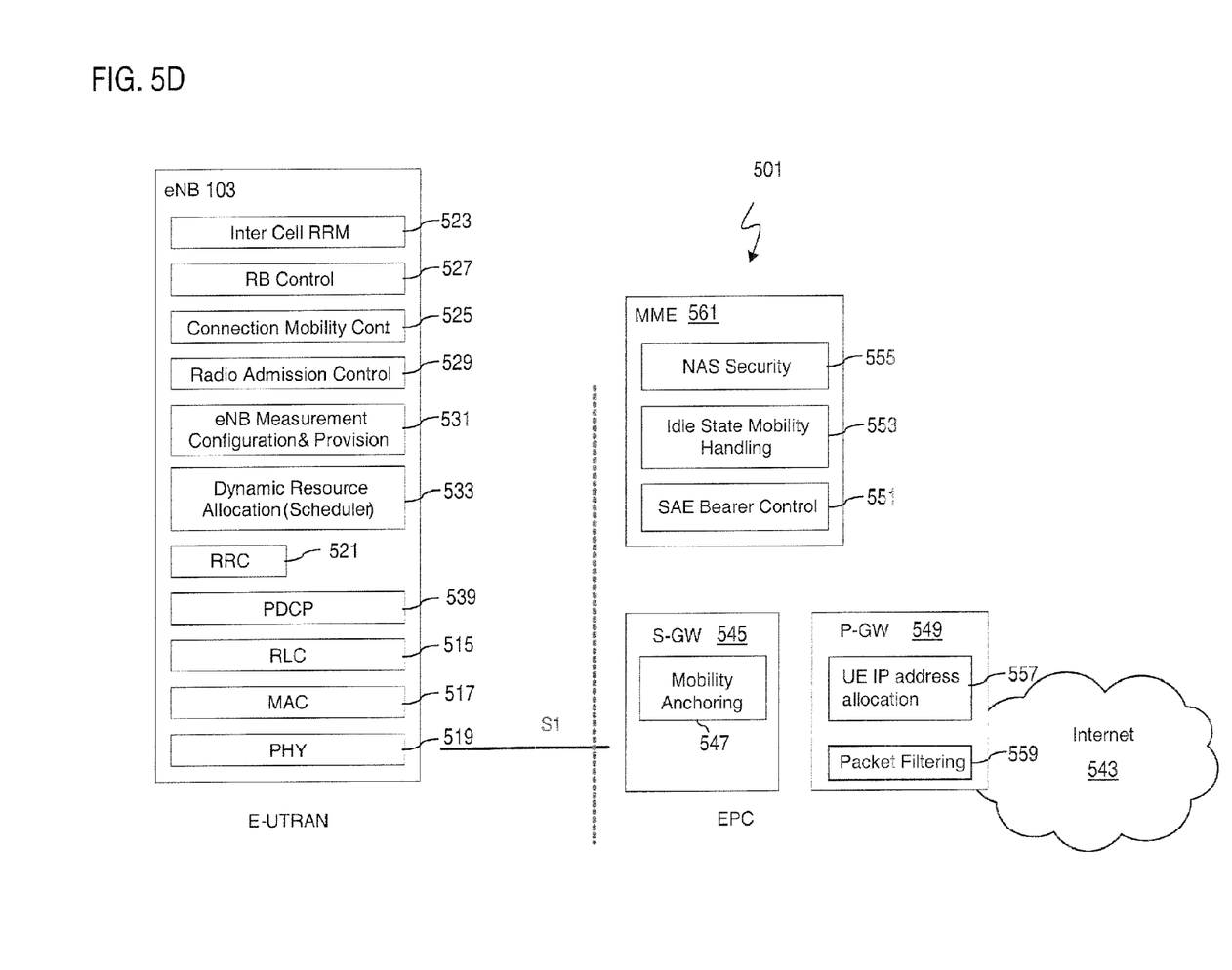

In an alternative embodiment, as shown in FIG. 5D, the PDCP (Packet Data Convergence Protocol) functionality can reside in the eNB rather than the GW 501. Other than this PDCP capability, the eNB functions of FIG. 5C are also provided in this architecture.

In the system of FIG. 5D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB interfaces via the S1 to the Serving Gateway 545, which includes a Mobility Anchoring function 547, and to a Packet Gateway (P-GW) 549, which provides an UE IP address allocation function 557 and Packet Filtering function 559. According to this architecture, the MME (Mobility Management Entity) 561 provides SAE (System Architecture Evolution) Bearer Control 551, Idle State Mobility Handling 553, NAS (Non-Access Stratum) Security 555.

One of ordinary skill in the art would recognize that the processes for providing acknowledgement signaling may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 6.

Figure 6:
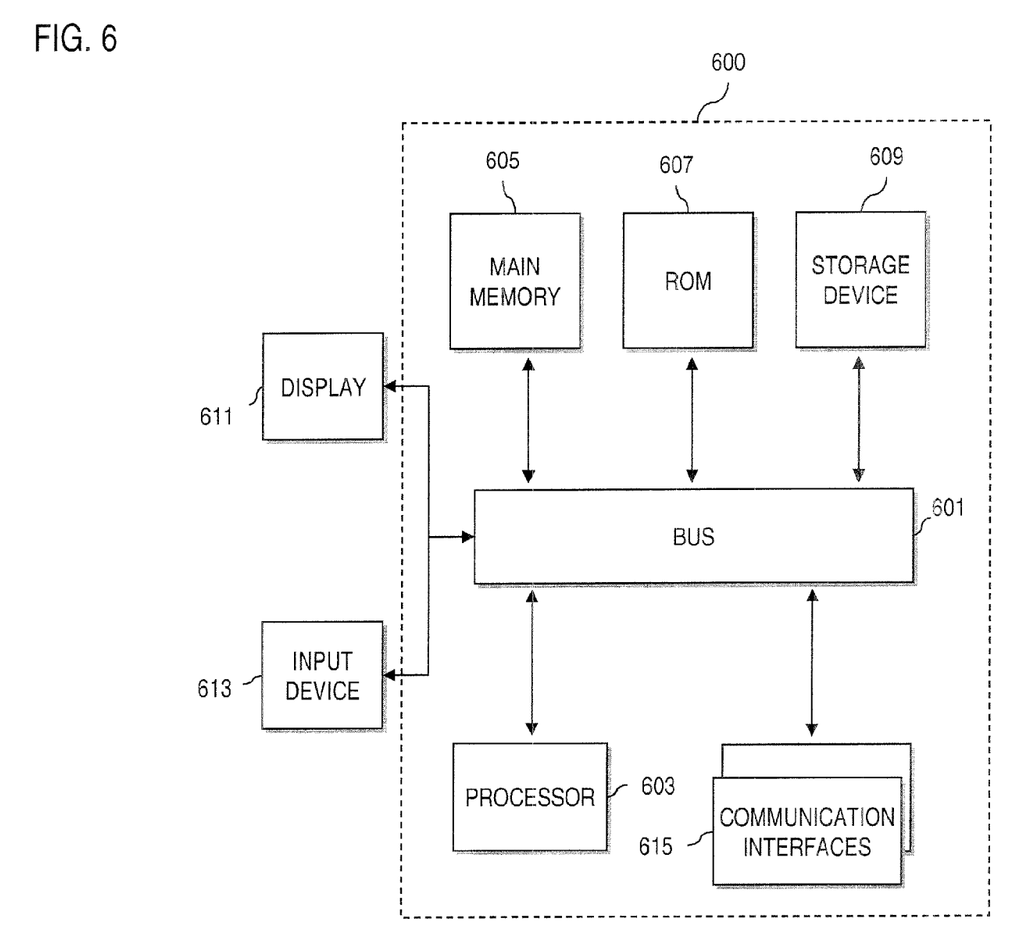
FIG. 6 is a diagram of hardware that can be used to implement an embodiment of the invention.

FIG. 6 illustrates exemplary hardware upon which various embodiments of the invention can be implemented. A computing system 600 includes a bus 601 or other communication mechanism for communicating information and a processor 603 coupled to the bus 601 for processing information. The computing system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computing system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computing system 600 may be coupled via the bus 601 to a display 611, such as a liquid crystal display, or active matrix display, for displaying information to a user. An input device 613, such as a keyboard including alphanumeric and other keys, may be coupled to the bus 601 for communicating information and command selections to the processor 603. The input device 613 can include a cursor control, such as a mouse, a trackball, or cursor direction keys, for communicating direction information and command selections to the processor 603 and for controlling cursor movement on the display 611.

According to various embodiments of the invention, the processes described herein can be provided by the computing system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 600 also includes at least one communication interface 615 coupled to bus 601. The communication interface 615 provides a two-way data communication coupling to a network link (not shown). The communication interface 615 sends and receives electrical, electromagnetic, or optical signals that carry digital data streams representing various types of information. Further, the communication interface 615 can include peripheral interface devices, such as a Universal Serial Bus (USB) interface, a PCMCIA (Personal Computer Memory Card International Association) interface, etc.

The processor 603 may execute the transmitted code while being received and/or store the code in the storage device 609, or other non-volatile storage for later execution. In this manner, the computing system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 7:
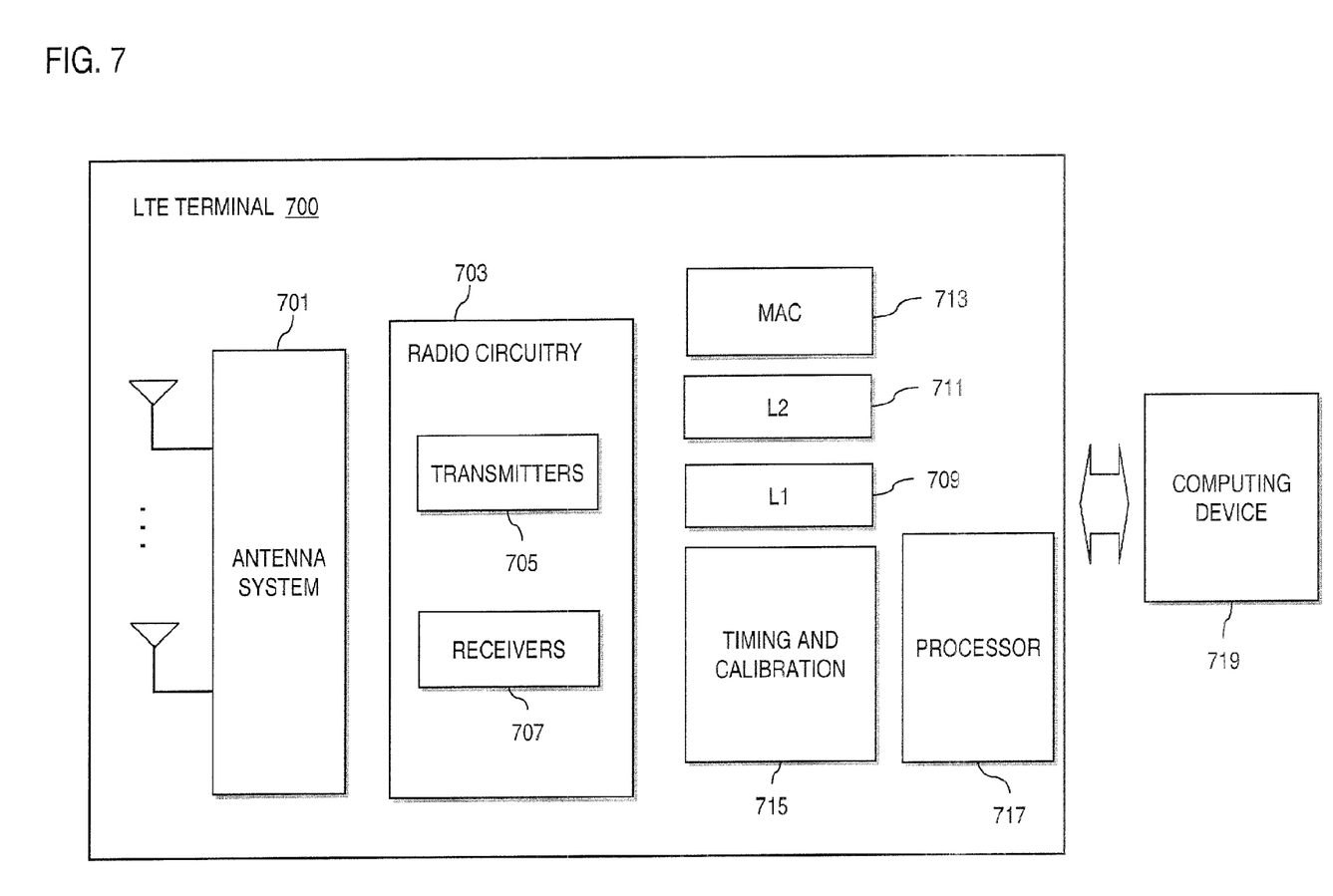
FIG. 7 is a diagram of exemplary components of an LTE terminal configured to operate in the systems of FIGS. 5A-5D, according to an embodiment of the invention.

FIG. 7 is a diagram of exemplary components of an LTE terminal capable of operating in the systems of FIGS. 5A-5D, according to an embodiment of the invention. An LTE terminal 700 is configured to operate in a Multiple Input Multiple Output (MIMO) system. Consequently, an antenna system 701 provides for multiple antennas to receive and transmit signals. The antenna system 701 is coupled to radio circuitry 703, which includes multiple transmitters 705 and receivers 707. The radio circuitry encompasses all of the Radio Frequency (RF) circuitry as well as base-band processing circuitry. As shown, layer-1 (L1) and layer-2 (L2) processing are provided by units 709 and 711, respectively. Optionally, layer-3 functions can be provided (not shown). Module 713 executes all MAC layer functions. A timing and calibration module 715 maintains proper timing by interfacing, for example, an external timing reference (not shown). Additionally, a processor 717 is included. Under this scenario, the LTE terminal 700 communicates with a computing device 719, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a resource allocation message, the resource allocation message comprising a first indication that resource allocation is intended for a first transmission of data or a second, different indication that the resource allocation is intended for retransmission of the data;
   receiving an explicit acknowledgement signaling regarding the data on a Physical Hybrid Automatic Repeat Request (HARQ) Indication Channel (PHICH); and
   retransmitting the data in response to the received resource allocation message comprising the second indication,
   wherein the explicit acknowledgment signaling regarding the data sent on the PHICH is ignored, and
   wherein the resource allocation message overrides the explicit acknowledgement signaling.

2. The method according to claim 1, wherein the first transmission and retransmission are according to a Hybrid Automatic Repeat Request (HARQ) scheme.

3. The method according to claim 1, further comprising:
   determining unsuccessful first transmission of the data upon receiving the resource allocation message with the second indication that the allocation of resources is intended for retransmission of the data.

4. The method according to claim 1, the method further comprising:
   determining to delete the data from a buffer storing the data after a timer, configured to specify life of the data within the buffer, expires and the resource allocation message is not received before the timer expires.

5. The method according to claim 1, wherein the resource allocation message is generated according to either a dynamic scheduling scheme or a semi-persistent scheduling scheme.

6. The method according to claim 1,
   wherein the resource allocation message is transmitted over a radio network and
   wherein the radio network is compliant with a long term evolution (LTE) architecture.

7. The method according to claim 1, wherein the resource allocation message is cyclic redundancy check (CRC) protected.

8. The method according to claim 1, wherein the resource allocation message utilizes a New Data Indicator (NDI) field to specify the first indication or the second indication.

9. An apparatus comprising:
   a wireless device configured to receive a resource allocation message, the resource allocation message comprising a first indication that resource allocation is intended for a first transmission of data or a second, different indication that the resource allocation is intended for retransmission of the data,
   wherein the wireless device is further configured to receive an explicit acknowledgement signaling regarding the data on a Physical Hybrid Automatic Repeat Request (HARQ) Indication Channel (PHICH),
   wherein the wireless device is further configured to retransmit the data in response to the received resource allocation message comprising the second indication,
   wherein the explicit acknowledgment signaling regarding the data sent on the PHICH is ignored, and
   wherein the resource allocation message overrides the explicit acknowledgement signaling.

10. The apparatus according to claim 9, wherein the first transmission and retransmission are according to a Hybrid Automatic Repeat Request (HARQ) scheme.

11. The apparatus according to claim 9, wherein unsuccessful first transmission of the data is determined to occur upon the wireless device receiving the resource allocation message with the second indication that the allocation of resources is intended for retransmission of the data.

12. The apparatus according to claim 9, further comprising:
   a buffer that stores the data and
   a timer configured to specify life of the data within the buffer,
   wherein the data packet is deleted from the buffer after the timer expires and the resource allocation message is not received before the timer expires.

13. The apparatus according to claim 9, wherein the resource allocation message is generated according to either a dynamic scheduling scheme or a semi-persistent scheduling scheme.

14. The apparatus according to claim 9,
   wherein the resource allocation message is transmitted over a radio network and
   wherein the radio network is compliant with a long term evolution (LTE) architecture.

15. The apparatus according to claim 9, wherein the resource allocation message is cyclic redundancy check (CRC) protected.

16. The apparatus according to claim 9, wherein the resource allocation message utilizes a New Data Indicator (NDI) field to specify the first indication or the second indication.

17. The apparatus according to claim 9, wherein the wireless device is a user equipment.

18. A non-transitory computer-readable storage medium carrying one or more sequences of one or more instructions which, when executed by one or more processors, cause an apparatus to at least perform the following steps:
   receiving a resource allocation message, the resource allocation message comprising a first indication that resource allocation is intended for a first transmission of data or a second, different indication that the resource allocation is intended for retransmission of the data;
   receiving an explicit acknowledgement signaling regarding the data on a Physical Hybrid Automatic Repeat Request (HARQ) Indication Channel (PHICH); and
   retransmitting the data in response to the received resource allocation message comprising the second indication,
   wherein the explicit acknowledgment signaling regarding the data sent on the PHICH is ignored, and
   wherein the resource allocation message overrides the explicit acknowledgement signaling.

19. The non-transitory computer-readable storage medium according to claim 18, wherein the apparatus is caused, at least in part, to further perform:
   determining unsuccessful first transmission of the data upon receiving the resource allocation message with the second indication that the allocation of resources is intended for retransmission of the data,
   wherein the resource allocation message is transmitted over a radio network, and
   wherein the radio network is compliant with a long term evolution (LTE) architecture.

20. The non-transitory computer-readable storage medium according to claim 18, wherein the apparatus is caused, at least in part, to further perform:
   determining to delete the data from a buffer storing the data after a timer, configured to specify life of the data within the buffer, expires and the resource allocation message is not received before the timer expires,
   wherein the resource allocation message is generated according to either a dynamic scheduling scheme or a semi-persistent scheduling scheme.

* * * * *